United States Patent
Brück et al.

(10) Patent No.: US 6,787,002 B2
(45) Date of Patent: Sep. 7, 2004

(54) COMPACT PLASMA REACTOR

(75) Inventors: Rolf Brück, Bergisch Gladbach (DE); Jörg-Roman Konieczny, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 47 days.

(21) Appl. No.: 10/307,957

(22) Filed: Dec. 2, 2002

(65) Prior Publication Data
US 2003/0086841 A1 May 8, 2003

Related U.S. Application Data

(63) Continuation of application No. PCT/EP01/05690, filed on May 18, 2001.

(30) Foreign Application Priority Data

Jun. 2, 2000 (DE) .......................................... 100 27 409

(51) Int. Cl.[7] .......................... B01J 19/08; B01J 19/12
(52) U.S. Cl. ....................... 204/164; 204/169; 204/170; 204/171; 204/173; 204/174; 204/177; 422/186.04; 422/186.29
(58) Field of Search ....................... 422/186.04, 186.29; 204/164, 169, 170, 171, 173, 174, 177

(56) References Cited

U.S. PATENT DOCUMENTS 5,603,893 A    2/1997  Gundersen et al. ........... 422/22
5,711,147 A    1/1998  Vogtlin et al. ................. 60/274
5,746,984 A    5/1998  Hoard ......................... 422/169
5,807,526 A    9/1998  Miljevic ...................... 422/174

FOREIGN PATENT DOCUMENTS

| EP | 0 821 995 A1 | 2/1998 |
| EP | 0 958 859 A1 | 11/1999 |
| WO | 95/31271 | 11/1995 |
| WO | 98/02233 | 1/1998 |

*Primary Examiner*—Rodney G. McDonald
(74) *Attorney, Agent, or Firm*—Laurence A. Greenberg; Werner H. Stemer; Ralph E. Locher

(57) ABSTRACT

A device for purifying an exhaust gas contains at least one first and one second component with a respective shell and core through which the exhaust flows, as well as with two front faces each. At least one of the front faces of the first component and at least one front face of the second component has a predetermined profile with elevations and depressions. The elevations of the front face of the first component extend into the depressions of the front face of the second component and vice versa, thereby configuring a penetration section. The first component is disposed electrically insulated from the second component. The components have a potential difference between them and plasma is generated in the penetration section. The compact plasma reactor reduces the pollutant concentration in the exhaust gas of an internal combustion engine operated in the lean mode, especially when combined with an oxidation catalyst.

23 Claims, 4 Drawing Sheets

COMPACT PLASMA REACTOR

CROSS-REFERENCE TO RELATED APPLICATION

This application is a continuation of copending International Application No. PCT/EP01/05690, filed May 18, 2001, which designated the United States and was not published in English.

BACKGROUND OF THE INVENTION

Field of the Invention

The invention relates to a device for purifying an exhaust gas. Such a device has at least a first component and a second component, each with a shell and a core, through which the exhaust gas can flow. Each of the components have two end faces, at least one end face of the first component and at least one end face of the second component have a predeterminable profile with elevations and depressions. The elevations of the end face of the first component extend into the depressions in the end face of the second component and vice versa, thereby forming a penetration section. Devices and methods of this type are used in particular to purify exhaust gases that are formed during the operation of motor vehicles.

In virtually all highly motorized countries, the pollutant levels in the exhaust gas from motor vehicles are subject to statutory limits. In particular, the carbon monoxide emitted and partially burnt or unburnt hydrocarbons are limited. Moreover, the exhaust gas contains the oxidation products of nitrogen NO and $NO_2$ (referred to jointly as $NO_x$) and pollutants formed from fuel impurities or additives, such as lead or sulfur compounds.

While effective devices and methods for converting carbon monoxide and hydrocarbons are already known, the conversion of the $NO_x$ causes problems, in particular during the cold-starting phase of an engine. One reason is that modern engines are predominantly operated in lean-burn mode, i.e. with a high oxygen concentration, that in combination with the high temperatures that occur in the engine and/or the exhaust system promotes the formation of nitrogen oxides.

It is possible to reduce the $NO_x$ by using known catalytic converters (reduction catalytic converters). However, to do this, reducing components, such as for example molecular hydrogen or carbon monoxide, have to be present in the exhaust gas, while significant oxygen concentrations have to be avoided. The affinity of molecular hydrogen and carbon monoxide is greater for oxygen, so that it is not possible to reduce the nitrogen oxides if high oxygen concentrations are present. Accordingly, it would be necessary to operate the engines with a rich mix, but this is not possible for a prolonged period on account of statutory conditions.

Known methods and devices for deNOxing exhaust gases are primarily based on reacting the nitrogen oxides with ammonia to form molecular nitrogen and steam. Without a catalytic converter, these reactions are carried out with excess ammonia and at temperatures of around 900° C. (SNCR process). With a catalytic converter, it is possible to use less excess ammonia and to lower the reaction temperature to 180 to 450° C. (SCR process).

In an SCR system, ammonia is atomized and in the process wets a catalytically active structure in the exhaust system. On the catalytically active surface of the structure, $NO_x$ reacts in the presence of the ammonia to form molecular nitrogen and water. These reactions preferably take place in an oxygen-rich environment. Furthermore, the reduction of the nitrogen oxides is greatly dependent on the temperature. Effective reduction takes place only in a temperature range of ±28° C. at a defined oxygen content in the exhaust gas. Below this temperature range, the catalytic activity of the structure drops and the ammonia supplied passes into the environment. If the temperature range is exceeded, the ammonia is preferentially converted into additional nitrogen oxide.

Known catalytic converters are unable to provide the required activity in the presence of a significant excess of oxygen and a sufficient service life on account of the presence of water to ensure suitable reduction of $NO_x$. The operation of known catalytic converters within a very narrow temperature window continues to cause additional problems.

Furthermore, there are known processes for the reduction of $NO_x$ in an oxygen-rich exhaust gas from automobiles that combine an exhaust-gas treatment by plasma and a selective catalytic reduction. The exhaust gas is formed of a multiplicity of atoms and molecules, which are converted into the plasma state when sufficient energy is supplied. In the process, the shells of these constituents are broken open by collision processes and positively charged ions, electrons and reactive free radicals are formed. The induced plasma oxidizes nitrogen monoxide to form nitrogen dioxide and breaks up the complex, partially burnt or unburnt hydrocarbons into smaller molecules. The smaller hydrocarbons significantly increase the activity of the catalytic converter and assist the oxidation of the nitrogen monoxide.

In combination with a catalytic converter, the hydrocarbons help to reduce the nitrogen dioxide to molecular nitrogen. This plasma-enhanced catalytic reaction can be schematically divided into two steps:

1. Plasma+NO+$O_2$+HC->$NO_2$+HC; and
2. Catalyst+$NO_2$+HC->$N_2$+$CO_2$+$H_2O$, where HC represents a large number of hydrocarbon molecules.

In the automotive industry, plasmas of this type are preferably generated by an electric field that is generated by a high voltage. In particular, it is preferable to generate plasma using a corona discharge or a dielectric barrier discharge. If a corona discharge is desired, a nonuniform orientation of the electric field is possible. For example, there are known devices with a wire that is surrounded by a very strong electric field which, however, drops significantly in the radially outward direction and does not reach the housing surrounding it, with the result that the formation of an arc is suppressed. Alternatively, the formation of arcs can be avoided by pulsed application of voltage. In the case of a dielectric barrier discharge, at least one electrode is coated with a dielectric. The arcs that form are extinguished below the surface of the dielectric material.

Known plasma reactors, for example from International Patent Disclosure WO 95/31271, are very complex and take up a large volume. For effective conversion of the nitrogen monoxide, the plasma has to be formed over a certain reaction distance. The reaction distance increases as the voltage applied becomes smaller and/or as the spacing between the electrodes increases.

SUMMARY OF THE INVENTION

It is accordingly an object of the invention to provide a compact plasma reactor that overcomes the abovementioned disadvantages of the prior art devices of this general type, which purifies an exhaust gas and brings about improved reduction of the $NO_x$ in the exhaust gas and has a compact structure.

With the foregoing and other objects in view there is provided, in accordance with the invention, a device for purifying an exhaust gas from an internal combustion engine. The device contains components including at least a first component and a second component. Each of the components has a shell and a core through which the exhaust gas flows. The components each have two end faces and at least one of the end faces of the first component and at least one of the end faces of the second component has a predeterminable profile containing elevations and depressions. The elevations of the end face of the first component extend into the depressions in the end face of the second component and vice versa, thereby forming a penetration section. The first component is disposed so that the first component is electrically insulated from the second component. The components have a potential difference with respect to one another and plasma being generated in the penetration section.

The device according to the invention for purifying the exhaust gas from the internal combustion engine is configured at least with the first component and the second component. Each component has a shell and a core, through which the exhaust gas can flow, with two end faces. At least one end face of the first component and at least one end face of the second component have a predeterminable profile containing elevations and recesses. The components are disposed in such a way that the elevations on the end side of the first component extend into the depressions in the end side of the second component and vice versa, with the result that a penetration section is formed.

The device according to the invention is distinguished by the fact that the first component is disposed so that it is electrically insulated from the second component, the components have a potential difference with respect to one another and a plasma can be generated in the penetration section. The application of a potential difference between the components avoids a complicated circuit for the structure of a plasma reactor. In the penetration section, adjacent elevations lie very close together, it being possible for plasma to be generated between the elevations on account of the voltage that is applied to the components. When a device of this type is disposed in an exhaust system, the exhaust gas flows through the first and second components, the reactivity of the pollutants that are present in the exhaust gas being improved by the plasma.

According to one embodiment, the components have at least one connection for the application of an electric voltage. These connections are configured in such a way as to be suitable for producing the electric field required. It is important in particular to ensure a high voltage with a high repetition rate. In addition, these connections satisfy the dynamic requirements in an exhaust system.

It is particularly advantageous if the core of the first component and/or of the second component at least in part has a honeycomb structure. The honeycomb structure provides a large surface area that can be utilized if necessary to convert pollutants, yet this structure nevertheless ensures that the core has a high strength.

It is particularly advantageous if the predeterminable profile of the first component is configured as a negative form of the profile of the second component. This results in a type of mating configuration, and the distances between adjacent elevations are kept very short, with the result that less energy is required in order to generate the plasma. In addition, if the profile is configured appropriately, assembly errors can be prevented when the device for purifying the exhaust gas is being put together.

According to yet another embodiment, the core of the first component and/or of the second component is formed from sheet-metal layers which are at least in part structured in such a way that the core has passages through which an exhaust gas can flow. On account of the high thermal conductivity, a core with sheet-metal layers improves the light-off performance of the device after an internal combustion engine has been started up.

It is particularly advantageous if the core has spaced-apart sheet-metal layers with an axial length, which form the elevations and depressions of the end face. To produce the core, generally a plurality of sheet-metal layers are stacked and then coiled or wound. If the sheet-metal layers with different axial lengths are used, ending flush at one end face, the sheet-metal layers with the greater axial length project on the opposite end side after the winding operation. The projecting ends of the sheet-metal layers form the elevations, while the spacers form the depressions.

According to another embodiment, the elevations of the first component are formed from at least partially structured sheet-metal layers and are connected to the positive terminal of a voltage source. The connection of the structured sheet-metal layers to the positive terminal of the voltage source has the advantage that it is possible for the structure itself to influence the formation of the electric field or of the discharges. Compared to a smooth, planar negative electrode, the structure constitutes distance-reducing embodiments, the field strength of the electric field being higher at locations with a short distance than in other regions.

In this context, it is particularly advantageous if the elevations of the second component are formed from smooth sheet-metal layers, the latter, at least in the penetration section, being configured with an electrically insulating coating and being grounded at a negative terminal. The smooth and insulated sheet-metal layers of the second component are disposed in the depressions between the partially structured sheet-metal layers of the first component. The electrical insulation forms a dielectric. The layer thickness is selected in such a way that the coating on the one hand has the dielectric action but on the other hand also satisfies the thermal and dynamic requirements in an exhaust system.

According to a further configuration of the device, the core of the components, at least in part, has a catalytically active surface. The combination of a plasma reactor with a catalytic converter reduces the concentration of nitrogen oxides in the exhaust gas considerably. If both components have a catalytically active surface outside the penetration section, a particularly compact device of a plasma reactor and of an oxidation catalytic converter is formed.

It is particularly advantageous for the first component and/or the second component to be at least partially surrounded by a housing. Particularly when the device according to the invention is disposed in a mobile exhaust system, such as for example in a passenger automobile, the housing prevents the device from being contaminated by external influences from the weather.

According to yet another embodiment, the components are electrically insulated with respect to the housing, in particular as a result of an insulating mat being disposed between the housing and the components. The electrical insulation of the components prevents current from flowing across the housing, with the result that the potential difference between the components is maintained.

It is particularly advantageous if the power supply to the component is electrically insulated through the housing. This too serves to prevent undesirable flows of currents and to maintain the potential difference between the components.

According to yet another embodiment, the components are fixed in the housing and/or with respect to one another by at least one holding device. The holding device therefore, on the one hand, fixes the axial and radial orientation of the components in the housing. On the other hand, the holding device offers the possibility of varying the size of the penetration section. If the components are spaced further apart from one another, the elevations of one component do not extend so deeply into the depressions in the other component, with the result that if appropriate only a narrowly delimited plasma can be generated.

In this context, it is particularly advantageous for the at least one holding device to extend through the housing. This allows a stable connection between the housing and the device having the two components.

According to a further embodiment, in each case one holding device is secured to the first component and the second component, and the holding devices are connected to one another. The connection is in this case configured in particular such that it is possible to adjust the desired axial distance between the two components.

According to yet another embodiment, the at least one holding device is made from an electrically insulating material, in particular ceramic, or has an electrically insulating outer surface. This ensures that the voltage applied in operation is not discharged into other regions of the exhaust system.

According to a further inventive idea, the invention proposes a method for operating the above-described device for purifying an exhaust gas from an internal combustion engine, in which a first component is disposed so that it is electrically insulated from a second component and the components have a potential difference with respect to one another. The method is distinguished by the fact that the potential difference between the components is applied at predeterminable time intervals, with the result that the plasma is produced in the penetration section. The fact that the plasma generation is limited in time prevents local overheating of the reactor or the exhaust gas.

In order nevertheless to ensure plasma which is as uniform as possible in the penetration section, it is advantageous to produce the potential difference with a repetition rate of 50 to 2000 Hz.

According to a further configuration of the method, the repetition rate and/or the magnitude of the potential difference is controlled as a function of the exhaust-gas temperature. A high repetition rate and a high voltage applied leads to heating of the exhaust gas, which is desirable in particular during the cold-start phase of an engine if a catalytically active component is connected downstream of the plasma reactor in order to convert pollutants.

It is particularly advantageous in this context if the repetition rate and/or the magnitude of the potential difference are reduced after a predeterminable exhaust-gas temperature has been reached. If the internal combustion engine is already providing exhaust gas at a temperature that is suitable, for example, for catalytic conversion, the repetition rate and/or the magnitude of the potential difference are reduced. The predeterminable exhaust-gas temperature is determined as a function of the conversion characteristics of the catalytic converter.

According to a further configuration of the method, the repetition rate and/or the magnitude of the potential difference is controlled as a function of the operating state of the internal combustion engine. The concentration of pollutants in the exhaust gas is dependent, inter alia, on the operating state of the engine. For example, if an automobile is in an acceleration phase, more fuel is burnt for a certain period of time, leading to an increase in the quantity of pollutants per unit time in the exhaust system. Accordingly, for example at a high engine speed, the repetition rate and/or the magnitude of the potential difference can be increased.

Other features which are considered as characteristic for the invention are set forth in the appended claims.

Although the invention is illustrated and described herein as embodied in a compact plasma reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
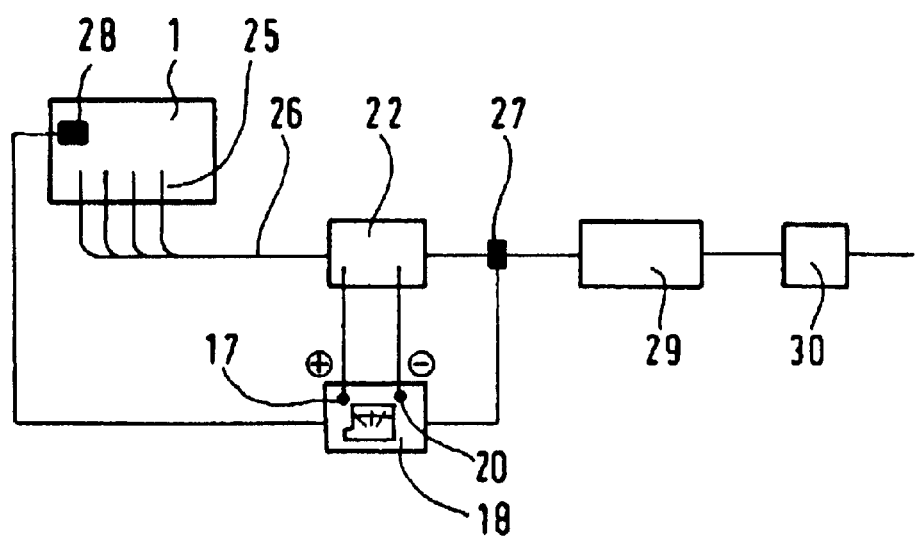
FIG. 1 is a block diagram of an exhaust system with an embodiment of a device according to the invention.

Referring now to the figures of the drawing in detail and first, particularly, to FIG. 1 thereof, there is shown diagrammatically an exhaust system as encountered, for example, in the automotive industry. An internal combustion engine 1 produces exhaust gases that are discharged to the environment through a manifold 25 and a following exhaust pipe 26. Components for converting pollutants contained in the exhaust gas are integrated in the exhaust pipe 26 illustrated. A catalytic converter 29 and a muffler 30 are connected further downstream of a housing 22 of a device according to the invention. The device according to the invention is >connected to a voltage source 18 via the housing 22, a component 2 of the device according to the invention being connected to a positive terminal 17 and a further component 3 being connected to a negative terminal 20. The voltage source 18 contains data and/or measured values from a sensor 27 or an engine control unit 28 and matches the repetition rate and the level of the voltage applied to the data and/or measured values received.

Figure 2:
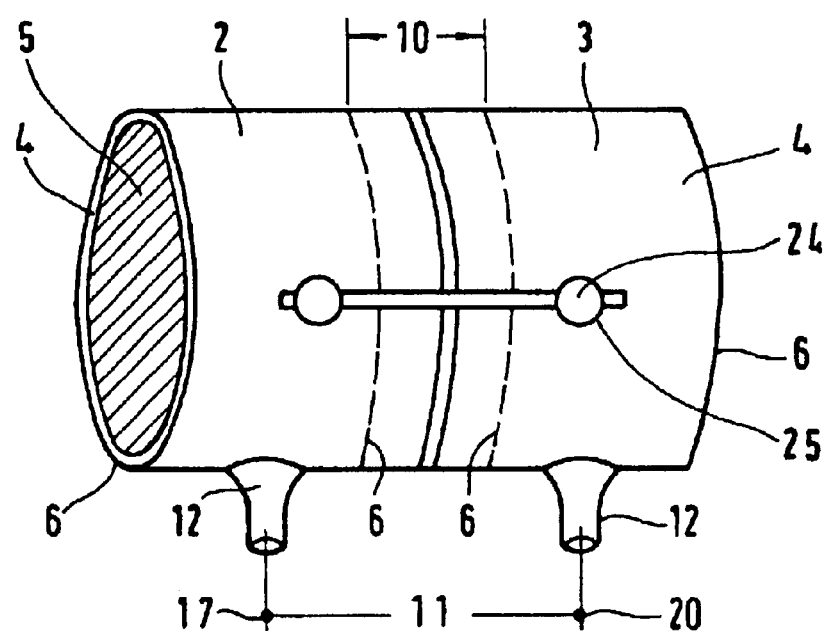
FIG. 2 is a diagrammatic, perspective view of the embodiment of the device.

FIG. 2 shows a perspective illustration of an embodiment of the inventive device for purifying the exhaust gas. The device is configured with a first component 2 and a second component 3, the components 2, 3 each having a shell 4 and a core 5 through which the exhaust gas can flow. Both of the components 2 and 3 are delimited by in each case two end faces 6. There is a connection 12, which is connected to the voltage source 18, disposed on the shell 4 of each of the components 2 and 3. In this way, a potential difference 11 is applied between the first component 2 and the second component 3. A position of the first component 2 and of the second component 3 with respect to one another is fixed by a holding device 24. Configuring the holding device 24 in this way makes it possible to vary the distance between the first component 2 and the second component 3. In this way, a penetration section 10 is formed. The holding device 24 has an electrically insulating outer surface 25, in order to prevent a drop in the potential difference 11 between the first component 2 and the second component 3.

Figure 3:
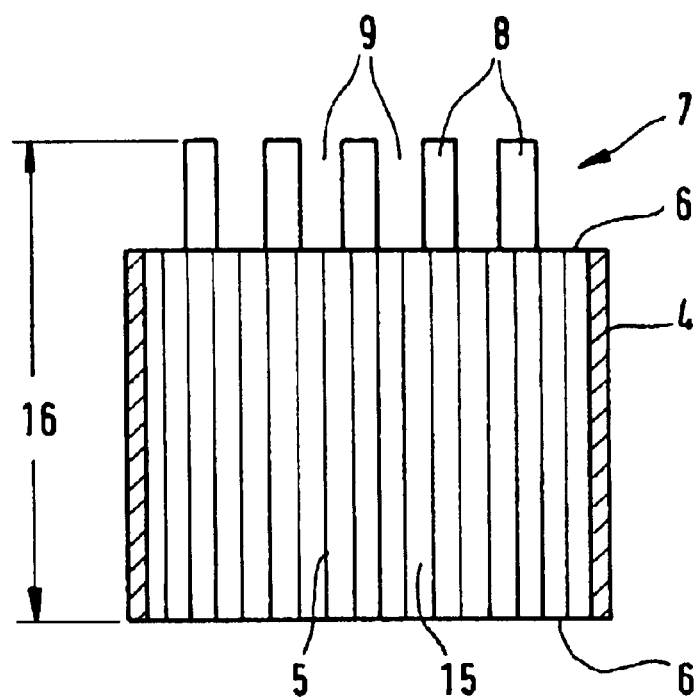
FIG. 3 is a longitudinal sectional view through an embodiment of a component.

FIG. 3 diagrammatically depicts a longitudinal section through a component of the device according to the invention. The core 5 is surrounded by the shell 4 and has a plurality of passages 15 through which the exhaust gas can flow. While one end side 6 of the component is planar, the opposite end face has a profile 7. The profile 7 includes a plurality of elevations 8 and depressions 9. A similar profile 7 can be produced, for example, by the core 5 being configured with metal sheet layers 31 that have different axial lengths 16.

Figure 4:
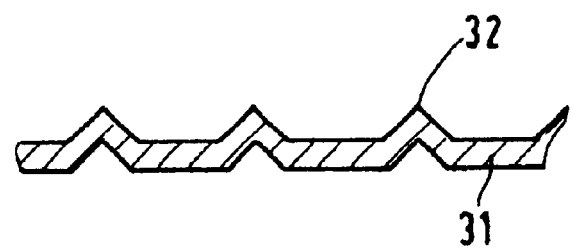
FIG. 4 is a sectional view of an embodiment of a structured metal sheet layer.
Figure 5:
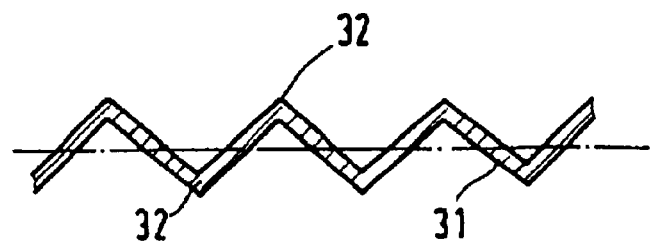
FIG. 5 is a sectional view of a further embodiment of the structured metal sheet layer.
Figure 6:
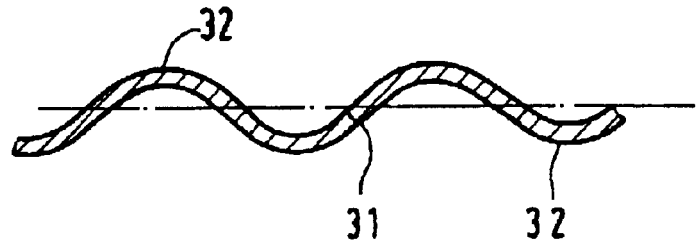
FIG. 6 is a sectional view of yet another embodiment of the structured metal sheet layer.

FIGS. 4 to 6 diagrammatically depict various embodiments of the structured metal sheet layers 31 with distance-reducing embodiments 32. The metal sheet layer 31 illustrated in FIG. 4 is particularly suitable for forming a plasma on one side, since the distance-reducing embodiments are only oriented in one direction, preferably toward the other electrode. FIG. 5 shows a metal sheet layer 31 that is suitable for symmetrical formation of plasma on both sides of the metal sheet layer 31. The embodiment shown in FIG. 6 has the advantage that the structure in the core 5 may if appropriate be suitable for catalytic conversion of the exhaust gas.

Figure 7:
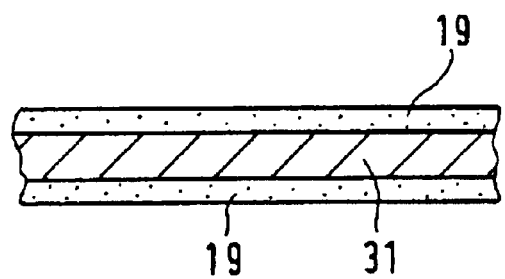
FIG. 7 is a sectional view of an embodiment of a smooth metal sheet layer.

FIG. 7 diagrammatically depicts a cross section through a smooth metal layer that is connected to the negative terminal 20 of the voltage source 18. On both sides, the smooth metal sheet layer 31 has an electrically insulating coating 19. The coating 19 is preferably applied to the metal sheet 31 only in the region of the elevations 8.

Figure 8:
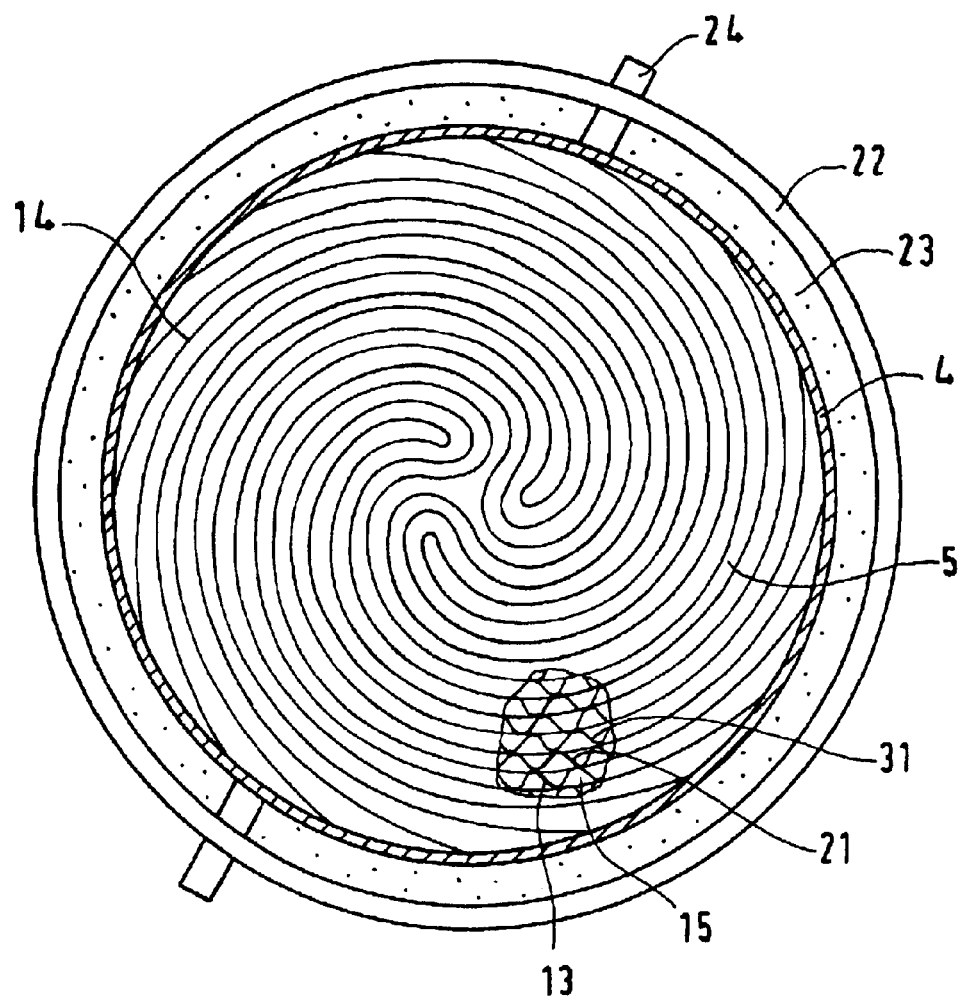
FIG. 8 is an end-side view of an embodiment and a further end-side view of the component of the device according to the invention.

FIG. 8 shows an end view of an embodiment of the device according to the invention. The device for purifying the exhaust gas is fixed in the housing 22 by the holding device 24 and is electrically insulated from the housing 22 by an insulating mat 23. The component 2 or 3 contains the shell 4 that surrounds the core 5 through which an exhaust gas can flow. The core 5 is composed of a multiplicity of sheet-metal layers 14, the sheet-metal layers 14 containing structured and smooth metal sheet layers 31 which form a honeycomb structure 13 with passages 15 through which the exhaust gas can pass. The honeycomb structure 13 has catalytically active surfaces 21.

Figure 9:
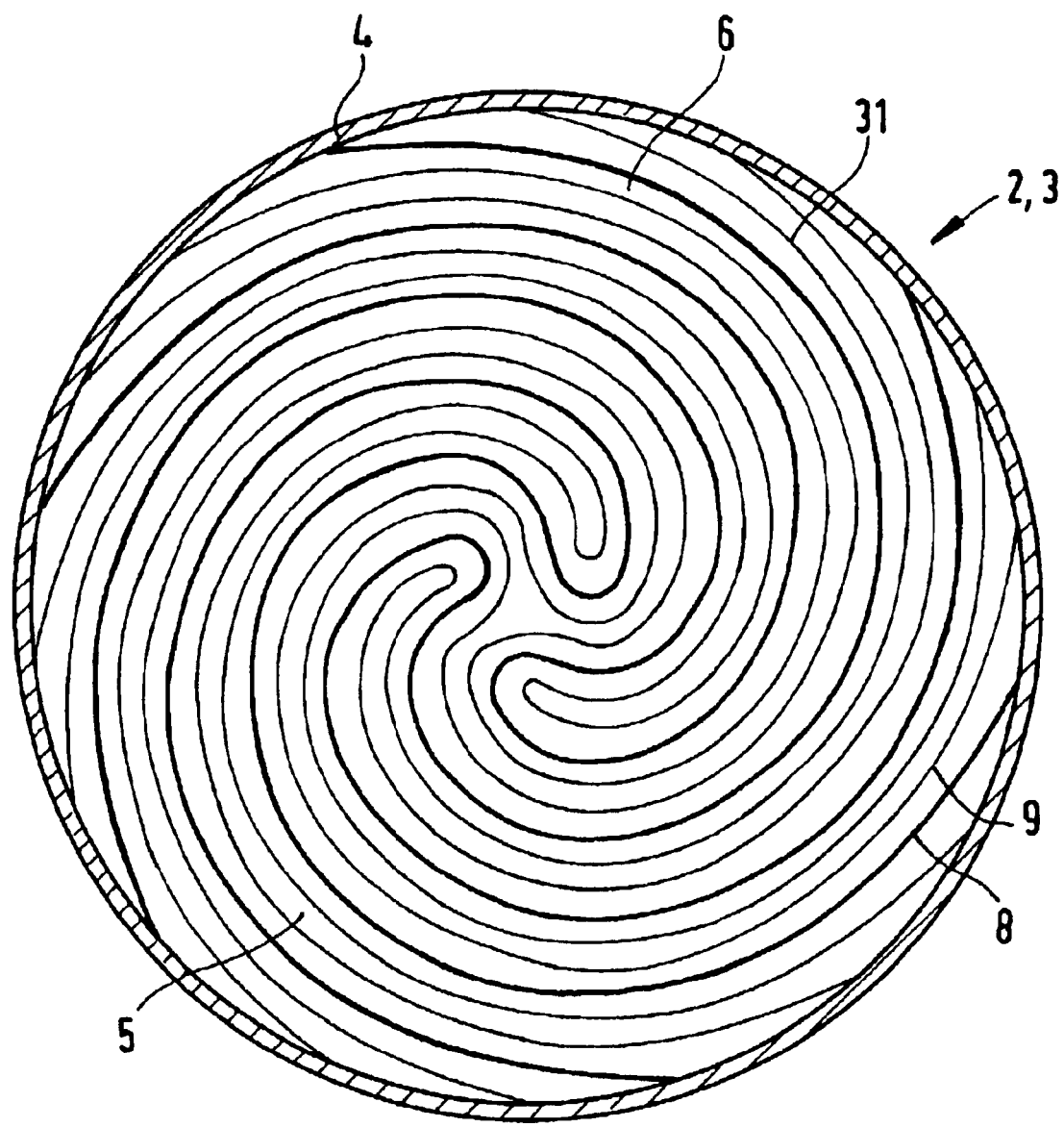
FIG. 9 is an end-side view of a further embodiment of the device according to the invention.

FIG. 9 shows an embodiment of the component 2 or 3 according to the invention, with the elevations 8 and the depressions 9. The core 5 contains a multiplicity of smooth and corrugated metal sheets, with some (shown in bold lines) of the smooth metal sheets 31 projecting beyond the end face of the component and therefore forming the elevations 8. The depressions 9 containing axially shorter metal sheets are disposed between the elevations 8. During assembly of the device, the elevations 8 of another component are disposed in the depressions 9. A plasma can be generated between the elevations 8 of the first component and the second component.

We claim:

1. A device for purifying an exhaust gas from an internal combustion engine, the device comprising:
   components including at least a first component and a second component, each of said components having a shell and a core through which the exhaust gas flows, said components each having two end faces and at least one of said end faces of said first component and at least one of said end faces of said second component having a predeterminable profile containing elevations and depressions, said elevations of said end face of said first component extending into said depressions in said end face of said second component and vice versa, thereby forming a penetration section, said first component disposed so that said first component being electrically insulated from said second component, said components having a potential difference with respect to one another and plasma being generated in said penetration section.

2. The device according to claim 1, wherein said components have at least one connection for an application of an electric voltage.

3. The device according to claim 1, wherein said core of at least one of said first component and said second component at least in part has a honeycomb structure.

4. The device according to claim 1, wherein said predeterminable profile of said first component is configured as a negative form of said predeterminable profile of said second component.

5. The device according to claim 1, wherein said core of at least one of said first component and said second component is formed from sheet-metal layers which are at least in part structured in such a way that said core has passages formed therein through which the exhaust gas can flow.

6. The device according to claim 5, wherein said sheet-metal layers of said core are spaced-apart and have an axial length, which form said elevations and depressions of said end face.

7. The device according to claim 5, wherein said elevations of said first component are formed from at least partially structured sheet-metal layers and are connected to a positive terminal of a voltage source.

8. The device according to claim 7, further comprising an electrically insulating coating, said elevations of said second component are formed from sheet-metal layers, said sheet-metal layers at least in said penetration section, are configured with said electrically insulating coating and are grounded at a negative terminal of the voltage source.

9. The device according to claim 1, wherein said core of said components, at least in part, has a catalytically active surface.

10. The device according to claim 1, further comprising a housing, and at least one of said first component and said second component is at least partially surrounded by said housing.

11. The device according to claim 10, further comprising an insulating mat disposed between said housing and said components for electrically insulating said components from said housing.

12. The device according to claim 10, wherein a voltage supply to be connected to said components is electrically insulated through said housing.

13. The device according to claim 10, further comprising a holding device, and said components are fixed at least one of in said housing and with respect to one another by said holding device.

14. The device according to claim 13, wherein said holding device extends through said housing.

15. The device according to claim 13, wherein said holding device is a plurality of holding devices, and in each case at least one of said holding devices is secured to said first component and to said second component, and said holding devices are connected to one another.

16. The device according to claim 13, wherein said holding device is made from an electrically insulating material.

17. The device according to claim 16, wherein said electrically insulating material is a ceramic.

18. The device according to claim 13, wherein said holding device has an electrically insulating outer surface.

19. A method of operating a device for purifying an exhaust gas from an internal combustion engine, the device containing components including at least a first component and a second component, each of the components having a shell and a core through which the exhaust gas flows, the components each having two end faces and at least one of the end faces of the first component and at least one of the end faces of the second component having a predeterminable profile containing elevations and depressions, the elevations of the end face of the first component extending into the depressions in the end face of the second component and vice versa, thereby forming a penetration section, the first component disposed so that the first component being electrically insulated from the second component, the components having a potential difference with respect to one another and a plasma being generated in the penetration section, which comprises the steps of:

disposing the first component to be electrically insulated from the second component, the components having the potential difference with respect to one another; and applying the potential difference between the components at predeterminable time intervals resulting in the plasma being produced in the penetration section.

20. The method according to claim 19, which comprises producing the potential difference with a repetition rate of 50 to 2000 Hz.

21. The method according to claim 20, which comprises controlling at least one of the repetition rate and a magnitude of the potential difference in dependence on an exhaust-gas temperature.

22. The method according to claim 21, which comprises reducing at least one of the repetition rate and the magnitude of the potential difference after a predeterminable exhaust-gas temperature has been reached.

23. The method according to claim 21, which comprises controlling at least one of the repetition rate and the magnitude of the potential difference in dependence on an operating state of the internal combustion engine.

* * * * *